| (12) | United States Patent | (10) Patent No.: | US 9,139,919 B2 |
|---|---|---|---|
| | Matsuyama et al. | (45) Date of Patent: | Sep. 22, 2015 |

(54) ELECTROLYSIS WATER-MAKING APPARATUS

(75) Inventors: Koki Matsuyama, Tokyo (JP); Tatsuya Midorikawa, Yokohama (JP)

(73) Assignee: Morinaga Milk Industry Co., Ltd., Tokyo (JP)

( * ) Notice: Subject to any disclaimer, the term of this patent is extended or adjusted under 35 U.S.C. 154(b) by 199 days.

(21) Appl. No.: 13/700,219

(22) PCT Filed: May 20, 2011

(86) PCT No.: PCT/JP2011/061641
§ 371 (c)(1),
(2), (4) Date: Nov. 27, 2012

(87) PCT Pub. No.: WO2011/152228
PCT Pub. Date: Dec. 8, 2011

(65) Prior Publication Data
US 2013/0068612 A1    Mar. 21, 2013

(30) Foreign Application Priority Data

May 31, 2010  (JP) ................. 2010-124879

(51) Int. Cl.
*C02F 1/46*    (2006.01)
*C25B 9/18*    (2006.01)
*C25B 9/20*    (2006.01)
*C25B 9/06*    (2006.01)
(Continued)

(52) U.S. Cl.
CPC ................. *C25B 9/00* (2013.01); *C02F 1/4674* (2013.01); *C25B 1/00* (2013.01); *C25B 9/20* (2013.01); *C02F 2201/004* (2013.01)

(58) Field of Classification Search
CPC .......... C02F 1/46; C02F 1/46104; C02F 9/18; C02F 9/20; C02F 9/203; C02F 9/206; C02F 9/06
USPC .......................................... 204/242, 193, 194
See application file for complete search history.

(56) References Cited

U.S. PATENT DOCUMENTS

| 6,096,177 A | 8/2000 | Kamitani et al. | |
|---|---|---|---|
| 2005/0087446 A1* | 4/2005 | Liang et al. | 204/524 |

FOREIGN PATENT DOCUMENTS

| CN | 1215699 A | 5/1999 |
|---|---|---|
| EP | 1 262 459 A1 | 12/2002 |

(Continued)

OTHER PUBLICATIONS

English Translation of JP11-235378 to Kato (1999).*

(Continued)

*Primary Examiner* — Zulmariam Mendez
(74) *Attorney, Agent, or Firm* — Wood, Herron & Evans, LLP

(57) ABSTRACT

An electrolysis water-making apparatus (1A) includes a casing (20), an electrolytic cell (4) installed in the casing (20) and configured to perform electrolysis on a raw material solution, a raw material solution feed pump (10) configured to pump the raw material solution to the electrolytic cell (4), and a diluting unit (26) configured to dilute electrolyzed products extracted from the electrolytic cell (4) with dilution water; and provided with a bracket (30) configured to integrally attach the electrolytic cell (4) and the raw material solution feed pump (10), and detachably fixed to the inside of the casing (20) in a state in which the electrolytic cell (4) and the raw material solution feed pump (10) are attached thereto.

4 Claims, 9 Drawing Sheets

(51) Int. Cl.
*C25B 9/00* (2006.01)
*C02F 1/467* (2006.01)
*C25B 1/00* (2006.01)

(56) References Cited

FOREIGN PATENT DOCUMENTS

| JP | 06099177 A | 4/1994 |
|---|---|---|
| JP | 10174972 A | 6/1998 |
| JP | 11169856 A | 6/1999 |
| JP | 11235378 A | 8/1999 |
| JP | 11253953 A | 9/1999 |
| JP | 2001062455 A | 3/2001 |
| JP | 2005035670 A | 2/2005 |
| JP | 2006122899 A | 5/2006 |
| JP | 2010069441 A | 4/2010 |

OTHER PUBLICATIONS

International Search Report issued in International Patent Application No. PCT/JP2011/061641, dated Jul. 5, 2011, 4 pages.
Search Report issued in Chinese Patent Application No. 201180026595.2; Jul. 17, 2013; 9 pages.
Office Action issued in Taiwanese Patent Application No. 100118107; Jul. 30, 2013; 8 pages.
Korean Intellectual Property Office, Notice to Submit a Response issued in corresponding Korean Patent Application No. 10-2012-7032751 and English-language translation dated Jun. 24, 2014 (9 pages).

\* cited by examiner

ELECTROLYSIS WATER-MAKING APPARATUS

TECHNICAL FIELD

The present invention relates to an electrolysis water-making apparatus for making electrolysis water used as sterilized water by performing electrolysis on a raw material solution.

Priority is claimed on Japanese Patent Application No. 2010-124879 filed on May 31, 2010, the contents of which are incorporated by reference herein.

BACKGROUND ART

In the related art, electrolysis water obtained by performing electrolysis on a solution including chlorine ions is known to have a low available chlorine concentration and a high chlorine sterilizing effect, and to have an advantageous property of high safety for humans. The electrolysis water is used to sterilize foods and instruments for processing the foods in food-related fields, or the like.

In particular, in recent times, since accurate quality/sanitary management of foods and goods for treating the foods is strongly required, utilization of the electrolysis water-making apparatus for making the electrolysis water (sterilized water) is further expected.

The electrolysis water-making apparatus includes an electrolytic cell configured to perform electrolysis on a raw material solution such as a hydrochloric acid solution or the like, a tank of a raw material solution such as hydrochloric acid or the like, a water supply system, a pump configured to pump a hydrochloric acid solution/dilution water or the like, an installation base of an electrolytic cell or the like, a mixer, a pipe group configured to connect the elements of this equipment, an electrolysis power supply configured to supply power to the electrolytic cell, and so on. For example, the apparatuses disclosed in the following Patent Documents 1 and 2 have been proposed as the conventional electrolysis water-making apparatus.

In addition, a technique of removing pipes without scattering electrolyzed products in the electrolytic cell when the electrolytic cell of water treatment equipment using the electrolytic cell is replaced with a new one is disclosed in Patent Document 3.

In the water treatment equipment, a drain pipe is installed under the electrolytic cell near a water inlet of the electrolytic cell. A drain valve is installed at the drain pipe. Then, stop water valves are installed at the piping of an upstream side of the drain pipe, and a pipe of an extraction side of the electrolyzed products extracted from the electrolytic cell. In the water treatment equipment, after one of the two stop water valves is closed to block a water flow, the drain valve is opened to entirely drain the electrolyzed products in the electrolytic cell between the two stop water valves and in running water pipes, and then the electrolytic cell is removed from the running water pipes.

RELATED ART DOCUMENT

Patent Document

[Patent Document 1] Japanese Unexamined Patent Application, First Publication No. 1999-169856

[Patent Document 2] Japanese Unexamined Patent Application, First Publication No. 2001-62455

[Patent Document 3] Japanese Unexamined Patent Application, First Publication No. 1994-99177

SUMMARY OF THE INVENTION

Problems to be Solved by the Invention

In the electrolytic cell of the electrolysis water-making apparatus and the feed pump configured to pump the hydrochloric acid solution/dilution water disclosed in Patent Documents 1 and 2, the former has a lifespan of an electrode plate, and the latter has deterioration of a tube or a diaphragm, or a lifespan of a motor or the like. Since all of these are expendable parts, replacement is needed at predetermined cycle of use. Upon the replacement, it is necessary to replace the inside of the electrolytic cell or the like by water from the chloride solution and electrolyzed products such that the chloride solution and electrolyzed products do not overflow and stick to hands or the like when the piping connected to the electrolytic cell or the like is removed. Thus, since the replacement process is time-consuming, there is room for improvement of working efficiency of the replacement.

When the electrolytic cell or the like can be replaced while holding the chloride solution and electrolyzed products in the electrolytic cell or the like, water replaced by the chloride solution and electrolyzed products is not needed. After the replacement of the electrolytic cell or the like, the replaced water should be discarded with no other use. For this reason, as the electrolytic cell or the like is replaced while holding the chloride solution and electrolyzed products in the electrolytic cell or the like, there is room for improvement of water conservation.

In addition, in the replacement of the electrolytic cell or the like, when water leakage generated when the piping is removed is left as it is, the inside of the casing of the electrolysis water-making apparatus may be corroded. Further, cleaning the inside of the casing is time-consuming. For this reason, as the water leak is prevented, there room to increase the working efficiency of replacement.

Furthermore, in the related art, the entire piping connected to the electrolytic cell or the feed pump is configured to be removed by inserting hands into the casing. For this reason, as the process in the casing is avoided, there is room for improvement of making the removal processing easier.

In addition, according to the water treatment equipment disclosed in Patent Document 3, in order to replace the electrolytic cell, the stop water valves should be installed at both of a pipe of an upstream side and a pipe of a downstream side of the electrolytic cell, and a drain pipe including a drain valve installed under the electrolytic cell should be separately provided. For this reason, the entire structure of the equipment becomes complicated and expensive.

Means for Solving the Problems

According to a first aspect of the present invention, an electrolysis water-making apparatus includes: a casing; an electrolytic cell installed in the casing and configured to electrolyze a raw material solution; a raw material solution feed pump configured to pump the raw material solution to the electrolytic cell; and a diluting unit configured to dilute electrolyzed products extracted from the electrolytic cell with dilution water, and a bracket configured to integrally attach the electrolytic cell and the raw material solution feed pump, and detachably fixed to the inside of the casing in a state in which the electrolytic cell and the raw material solution feed pump are attached thereto.

According to a second aspect of the present invention, a first piping is connected between the raw material solution feed pump and a storage tank configured to store the raw material solution, and a connecting location of the first piping and the raw material solution feed pump is disposed over the storage tank.

According to a third aspect of the present invention, a second piping is connected between the electrolytic cell and the diluting unit, and a connecting location of the second piping and the diluting unit is disposed over a connecting location of the second piping and the electrolytic cell.

According to a fourth aspect of the present invention, the first and second pipings are formed of a flexible pipe.

According to a fifth aspect of the present invention, the first and second pipings have lengths such that the bracket is extractable to the outside of the casing in a state in which the raw material solution feed pump, the electrolytic cell, and the diluting unit are connected to the connecting locations.

According to a sixth aspect of the present invention, a dilution water feed pump configured to pump dilution water to the electrolytic cell is provided, and the dilution water feed pump is detachably attached to the bracket.

According to a seventh aspect of the present invention, the dilution water feed pump is detachably attached to the bracket with a variable angle.

According to an eighth aspect of the present invention, the casing and the bracket are detachably fixed to one place.

Effects of the Invention

According to the electrolysis water-making apparatus in accordance with the first aspect of the present invention, after the electrolytic cell and the raw material solution feed pump are integrally removed by the bracket and moved to the outside of the casing, the solution in the electrolytic cell or the raw material solution feed pump is treated. Accordingly, in the replacement of the electrolytic cell or the raw material solution feed pump, a process of replacing the inside of the electrolytic cell or the like by water can be omitted, and thus, working efficiency of the replacement can be increased.

In addition, since the process of replacing the inside of the electrolytic cell or the like by water can be omitted, water can be saved.

Further, since the replacement process can be performed outside the casing, the process can be easily and safely performed.

Furthermore, since the bracket to which the electrolytic cell and the raw material solution feed pump are integrally attached is used to replace the electrolytic cell or the like, a structure of the electrolysis water-making apparatus can be simplified and manufacturing cost can be suppressed.

According to the electrolysis water-making apparatus in accordance with the second aspect of the present invention, the connecting location of the first piping and the raw material solution feed pump is disposed over the storage tank. For this reason, when the first piping is removed from the raw material solution feed pump, the raw material solution in the first piping flows to the storage tank and does not easily overflow in the casing. In addition, in the electrolysis water-making apparatus according to the third aspect of the present invention as well, the electrolyzed products in the second piping cannot easily overflow in the casing. Accordingly, a task of cleaning the inside of the casing is omitted, and working efficiency upon replacement of the raw material solution feed pump or the electrolytic cell can be increased.

Further, since a structure for preventing the solution in the electrolytic cell or the raw material solution feed pump from overflowing is simple, manufacturing cost of the electrolysis water-making apparatus can be suppressed.

According to the electrolysis water-making apparatus in accordance with the fourth aspect of the present invention, the first and second pipings can be smoothly bent. For this reason, a connecting process of the piping can be easily performed.

According to the electrolysis water-making apparatus in accordance with the fifth aspect of the present invention, the electrolytic cell and the raw material solution feed pump are integrally removed with the bracket to the outside of the casing, and the first and second pipings can be removed from the electrolytic cell and the raw material solution feed pump. Accordingly, since the replacement process of the inside of the casing can be easily performed with no contamination of the inside of the casing due to the raw material solution or electrolyzed products, working efficiency can be further improved.

According to the electrolysis water-making apparatus in accordance with the sixth aspect of the present invention, the dilution water feed pump can be attached to the bracket. For this reason, the bracket can be removed to the outside of the casing to perform the replacement process of the dilution water feed pump, and the replacement process can be easily performed.

According to the electrolysis water-making apparatus in accordance with the seventh aspect of the present invention, when the dilution water feed pump is attached to the bracket, an angle of the dilution water feed pump and the bracket can be appropriately selected and attached. For this reason, for example, when workability is bad due to interference with the piping of the dilution water feed pump, the angle of the dilution water feed pump can be varied to be attached to the bracket, and the workability can be further improved.

According to the electrolysis water-making apparatus in accordance with the eighth aspect of the present invention, the casing and the bracket can be detachably fixed to one place. For this reason, the fixing at one place may be released when the bracket is removed from the casing. In addition, only one place may be fixed when the bracket is mounted in the casing. Any fixing can be simply performed, workability can be improved, and part cost can also be reduced.

MODES FOR CARRYING OUT THE INVENTION

Hereinafter, embodiments of an electrolysis water-making apparatus according to the present invention will be described with reference to the accompanying drawings.

Here, a raw material solution including chlorine ions, which is a raw material of electrolysis water, is water including chlorine ions such as a sodium chloride solution, a hydrochloric acid solution, or the like.

The electrolysis water-making apparatus according to the present invention perform electrolysis on such a raw material solution. Chlorine gas is generated by an action of electrolytic oxidation by the electrolysis. The chlorine gas generated by the action of electrolytic oxidation is dissolved in water to generate hypochlorious acid in water.

Figure 1:
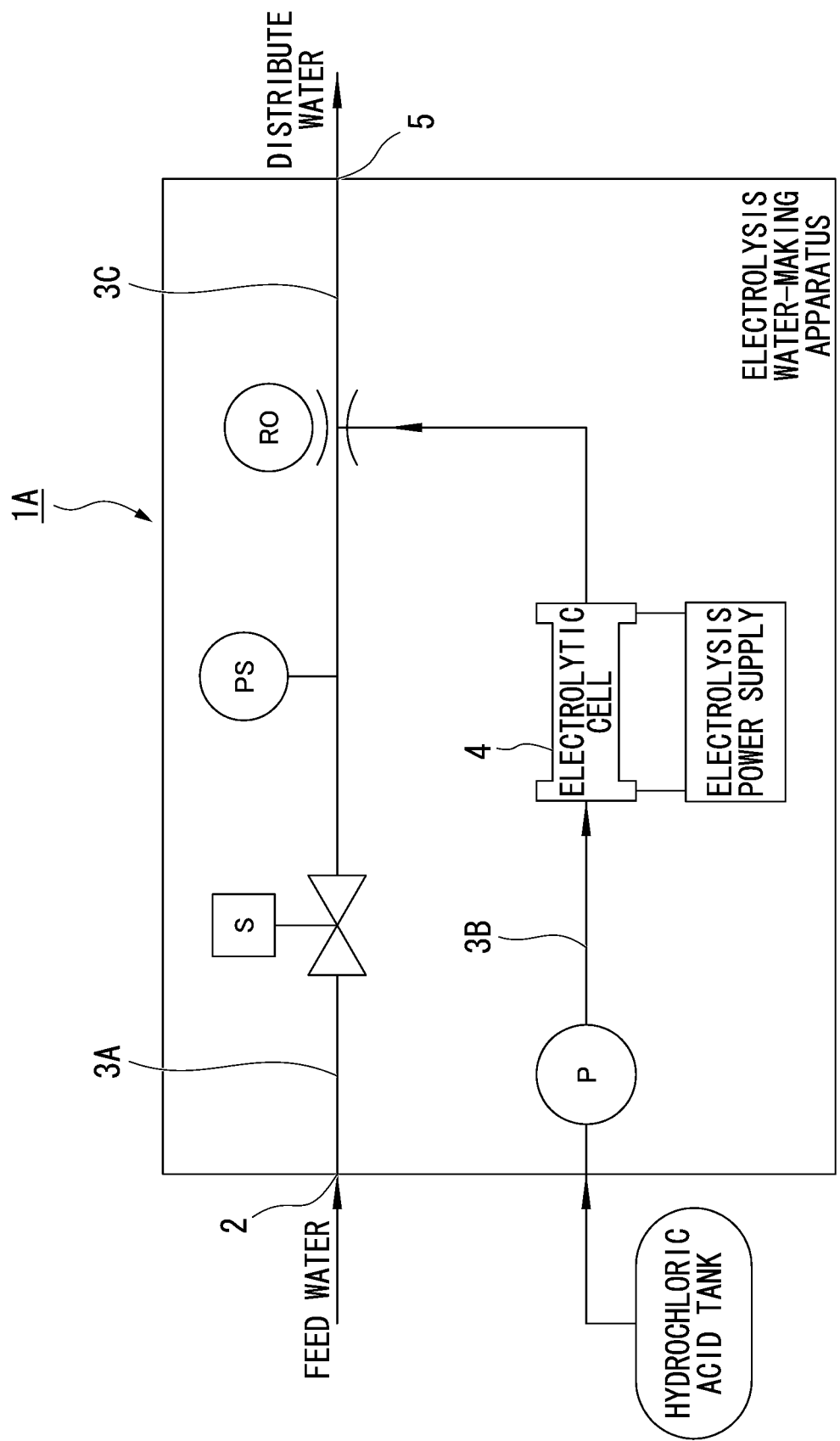
FIG. 1 is a view schematically showing a configuration of an electrolysis water-making apparatus according to a first embodiment of the present invention.

As shown in FIG. 1, an electrolysis water-making apparatus 1A includes a raw water line 3A through which raw water (dilution water) flowing from a raw water inlet 2 flows, an electrolyzed products line 3B configured to supply a hydrochloric acid solution, which is a raw material solution, into an electrolytic cell 4 of the electrolysis water-making apparatus 1A and extract the electrolyzed products electrolytically treated in the electrolytic cell 4, and an electrolysis water supply line 3C configured to dilute the electrolyzed products generated in the electrolyzed products line 3B and supply the electrolysis water, which is finally sterilized water, into an ejection port 5.

Figure 2:
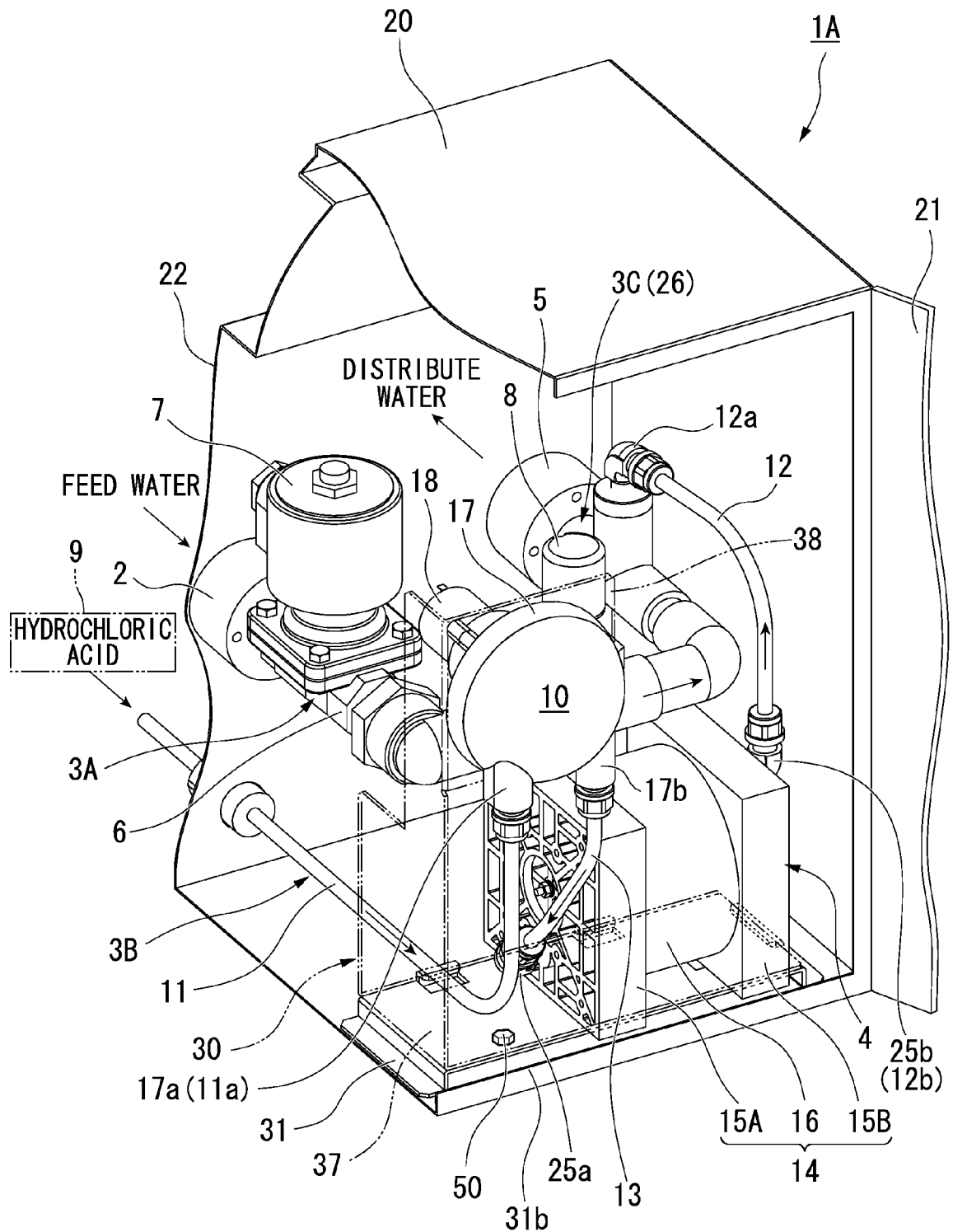
FIG. 2 is a perspective view showing the inside of the electrolysis water-making apparatus according to the first embodiment of the present invention.

As shown in FIG. 2, the lines 3A to 3C are accommodated in a substantially rectangular casing 20 except for a storage tank 9. For this reason, an opening/shutting door 21 installed at a side surface of the casing 20 is opened, and the parts can be appropriately repaired and inspected.

The raw water line 3A includes a strainer (not shown), an on-off valve (solenoid valve) 7 configured to open/close a flow of raw water at a downstream side of the strainer, a pressure switch 8 configured to control a pressure of raw water flowing inside a piping at a downstream side of the solenoid valve 7, and a check valve (not shown) configured to prevent backward flow of the raw water, which are installed at a water supply line 6 through which the raw water flowing from the raw water inlet 2 flows.

In the water supply line 6, the raw water inlet 2 and the ejection port 5 of the electrolysis water are attached to an intermediate section in a vertical direction of a side plate 22 of the casing 20.

The electrolyzed products line 3B includes the storage tank 9 configured to store the hydrochloric acid solution, a raw material solution feed pump 10 configured to discharge the hydrochloric acid solution from the storage tank 9 and pump the hydrochloric acid solution toward the electrolytic cell 4, and the electrolytic cell 4 configured to perform electrolysis on the pumped hydrochloric acid solution. The storage tank 9 and the pump 10 are connected by a first piping 11. The electrolytic cell 4 and the electrolysis water supply line 3C are connected by a second piping 12. Further, the pump 10 and the electrolytic cell 4 are connected by a third piping 13.

All of the first to third pipings 11, 12 and 13 are configured by flexible pipes. A connector (not shown) is connected to the electrolytic cell 4, and power is supplied from an electrolysis power supply.

Disposition of the members is as follows. A connecting location 11a of the first piping 11 and the pump 10 is disposed over the storage tank 9. The pump 10 is disposed over the electrolytic cell 4. A connecting location 12a of the electrolysis water supply line 3C and the second piping 12 is disposed over a connecting location 12b of the electrolytic cell 4 and the second piping 12. Then, the pump 10 and the electrolytic cell 4 are integrally attached to a bracket 30 to be detachably installed in the casing 20.

The electrolytic cell 4 is configured such that a unit cell configured to electrolyze the hydrochloric acid solution is formed in a chassis 14. The chassis 14 includes side plates 15A and 15B and a body 16. The chassis 14 is formed of a plastic such as polyvinyl chloride, polycarbonate, polyacrylate acrylate, or the like.

The side plates 15A and 15B are rectangular plates having a predetermined thickness. An inlet 25a configured to introduce the hydrochloric acid solution is formed under the side plate 15A. An outlet 25b (the connecting location 12a) configured to extract the electrolyzed products, which are electrolytically treated, is formed over the side plate 15B.

The body 16 is a member having a cylindrical shape. A plurality of electrode plates disposed in a direction perpendicular to a center axis of the body 16 are arranged in an inner space of the body 16. In the body 16, the raw material solution in the electrolytic cell 4 is electrolyzed by a current flowing through the plurality of electrode plates. The side plates 15A and 15B are disposed to water-tightly cover mounting holes of both ends of the body 16, and fixed to the body 16.

The raw material solution feed pump 10 is constituted by a pump body 17 having a disc shape, and an actuator 18. The pump body 17 accommodates a tube and a rotor configured to rotate a roller that crushes the tube, and moves the hydrochloric acid solution in the tube by rotation of the rotor. The actuator 18 drives the rotor. An inlet 17a (the connecting location 11a) configured to suction the hydrochloric acid solution and an output port 17b configured to pump the hydrochloric acid solution toward the electrolytic cell 4 are formed under the pump body 17.

The electrolytic cell 4 and the pump 10 are installed in the casing 20 having the above-mentioned positional relationship, integrally attached to the bracket 30, and detachably fixed to an installation base 31 in the casing 20 via the bracket 30. The bracket 30 facilitates the replacement process when appropriate replacement is needed due to lifespan of the electrode plate of the electrolytic cell 4 and deterioration of the tube or a diaphragm of the pump 10 or lifespan of the motor.

The installation base 31 is a substantially rectangular base frame having a predetermined thickness. The installation base 31 is fixed to the opening/shutting door 21 side (hereinafter referred to as a side near the casing) of the casing 20 by welding.

Figure 3:
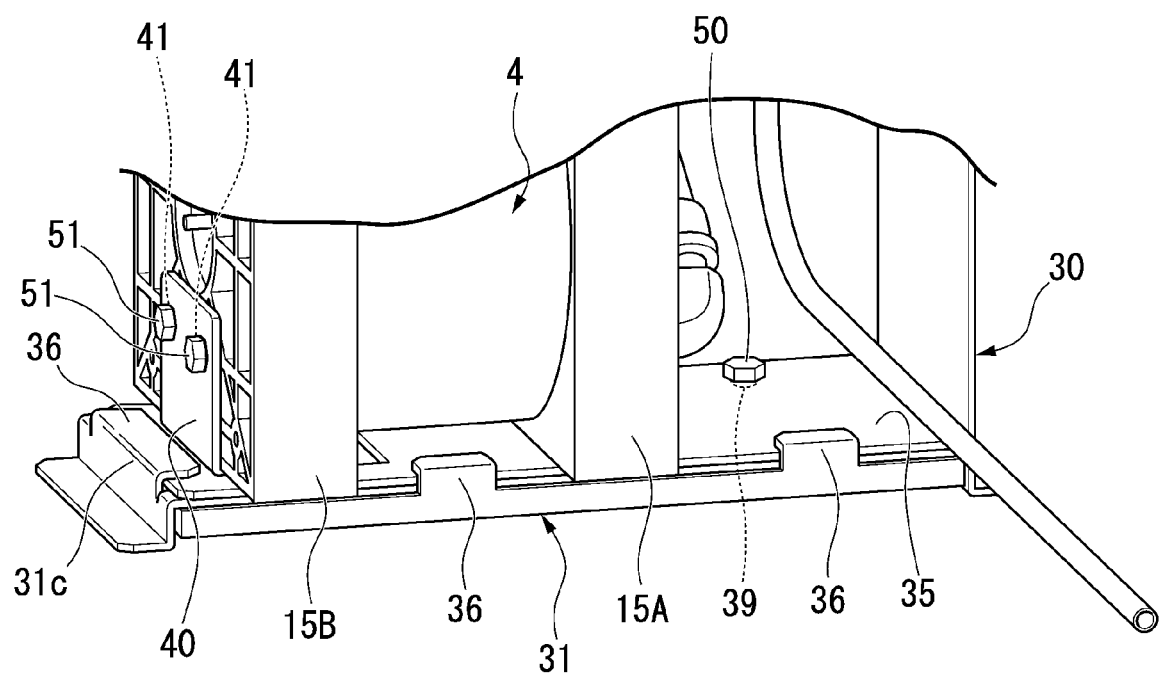
FIG. 3 is a rear perspective view showing a portion of the inside of the electrolysis water-making apparatus according to the first embodiment of the present invention.

As shown in FIG. 3, a male screw hole 39 into which a bolt 50 can be screwed is formed at a side of the installation base 31 near the case (a depth side of the drawing). Catching plates 36, 36 . . . standing up and bent inward toward the installation base 31 and configured to sandwich a bottom plate section 35 of the bracket 30 are formed at an edge of a depth side (a near side of the drawing) and an edge of a side portion of the casing 20.

Figure 4:
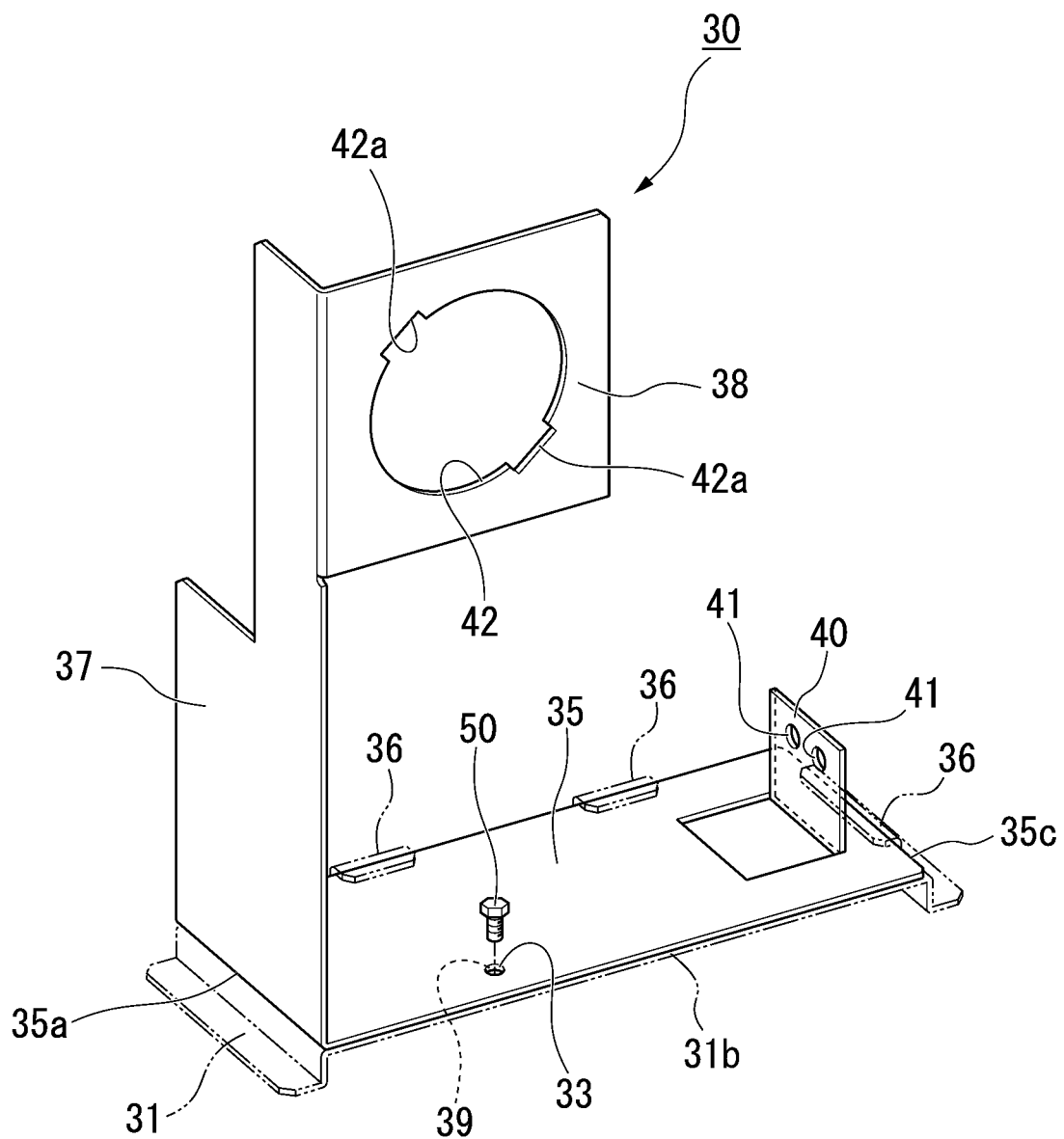
FIG. 4 is a perspective view showing a bracket of the electrolysis water-making apparatus according to the first embodiment of the present invention.

As shown in FIG. 4, the bracket 30 is formed by bending a plate formed of a metal or plastic. The bracket 30 includes the bottom plate section 35 fixed to an upper surface of the installation base 31 and attachable to the electrolytic cell 4 shown in FIG. 2, a side plate section 37 vertically standing up from an edge 35a of a side portion of the bottom plate section 35, and a pump attachment section 38 extending from a side edge in a vertical direction forming the side plate section 37 in a direction perpendicular to the side plate section 37.

A through hole 33 into which the bolt 50 can be inserted is formed at the bottom plate section 35 of the bracket 30 to match a position of the male screw hole 39 formed in the installation base 31. The bottom plate section 35 having the through hole 33 is inserted into lower sides of the catching plates 36, 36 . . . formed at the installation base 31, and the bracket 30 is detachably attached to the installation base 31 by screwing the bolt 50 into the through hole 33 and the male screw hole 39. In addition, a rigid wall 40 of the electrolytic cell at which the electrolytic cell 4 shown in FIG. 2 is installed is formed at the bottom plate section 35 to approach a side edge 35c opposite to the side edge 35a at which the side plate section 37 is formed.

The rigid wall 40 of the electrolytic cell is a wall section vertically standing up from the bottom plate section 35. The rigid wall 40 of the electrolytic cell has through holes 41 and 41 into which bolts are inserted to fix the electrolytic cell 4. On the other hand, in FIG. 3, male screw holes (not shown) into which bolts 51 and 51 can be screwed through the through holes 41 and 41 are formed in the side plate 15B of the electrolytic cell 4.

As shown in FIGS. 2 and 4, the pump attachment section 38 is formed over the side plate section 37 of the bracket. The side plate section 37 is configured such that the pump 10 attached to the pump attachment section 38 has a height which is capable of being disposed over the storage tank 9 and the electrolytic cell 4.

The pump attachment section 38 is formed to extend from an upper edge of the side plate section 37 along an inner wall surface of the casing 20 to be disposed at a side of the installation base 31 near the casing. A mounting hole 42 configured to mount the pump 10 is formed inside the pump attachment section 38.

A pair of hooks 42a and 42a are formed at the mounting hole 42. Then, on the other hand, a pair of catching plates (not shown) are snap-fitted to the hooks 42a at a rear side of the pump body 17 of the pump 10 (a side in contact with the pump attachment section 38). As will be described below, the hooks 42a are fitted to the catching plates of the pump 10 to become an angle determining unit of the pump 10.

When the pump 10 is attached to the bracket 30, first, the actuator 18 is inserted into the mounting hole 42. Here, a pair of recesses (not shown) formed at the rear side of the pump body 17 are inserted to be fitted to the pair of hooks 42a and 42a formed at the mounting hole 42. As the hooks 42a and 42a are fitted to the pair of catching plates of the pump 10, an angle of the pump 10 with respect to the bracket 30 always becomes a predetermined angle, and the pump 10 is prevented from being pivoted with respect to the bracket 30.

Then, the pump 10 is appropriately fixed by a fastener such as a bolt or a clip (not shown) installed at the pump body 17 and the pump attachment section 38 with the pump attachment section 38 sandwiched therebetween.

As shown in FIG. 2, the electrolysis water supply line 3C constitutes a diluting unit 26 configured to dilute the electrolyzed products introduced from the electrolytic cell 4 by the raw water of the water supply line 6 and generate the electrolysis water. The electrolysis water supply line 3C is formed at the most downstream side of the water supply line 6.

As described above, the water supply line 6, the electrolytic cell 4, the pump 10, and a portion of the pump 10 side of the first piping 11 and the second and third pipings 12 and 13 connected thereto are accommodated in the casing 20. The electrolytic cell 4 and the pump 10 are integrally and detachably attached to the bracket 30 to be easily drawn from the opening/shutting door 21 of the casing 20. Further, the bracket 30 is fixed to the installation base 31 in the casing 20 by the bolt 50.

Next, a method of replacing the electrolytic cell 4 or the pump 10 of the electrolysis water-making apparatus 1A or both of them will be described.

Figure 5:
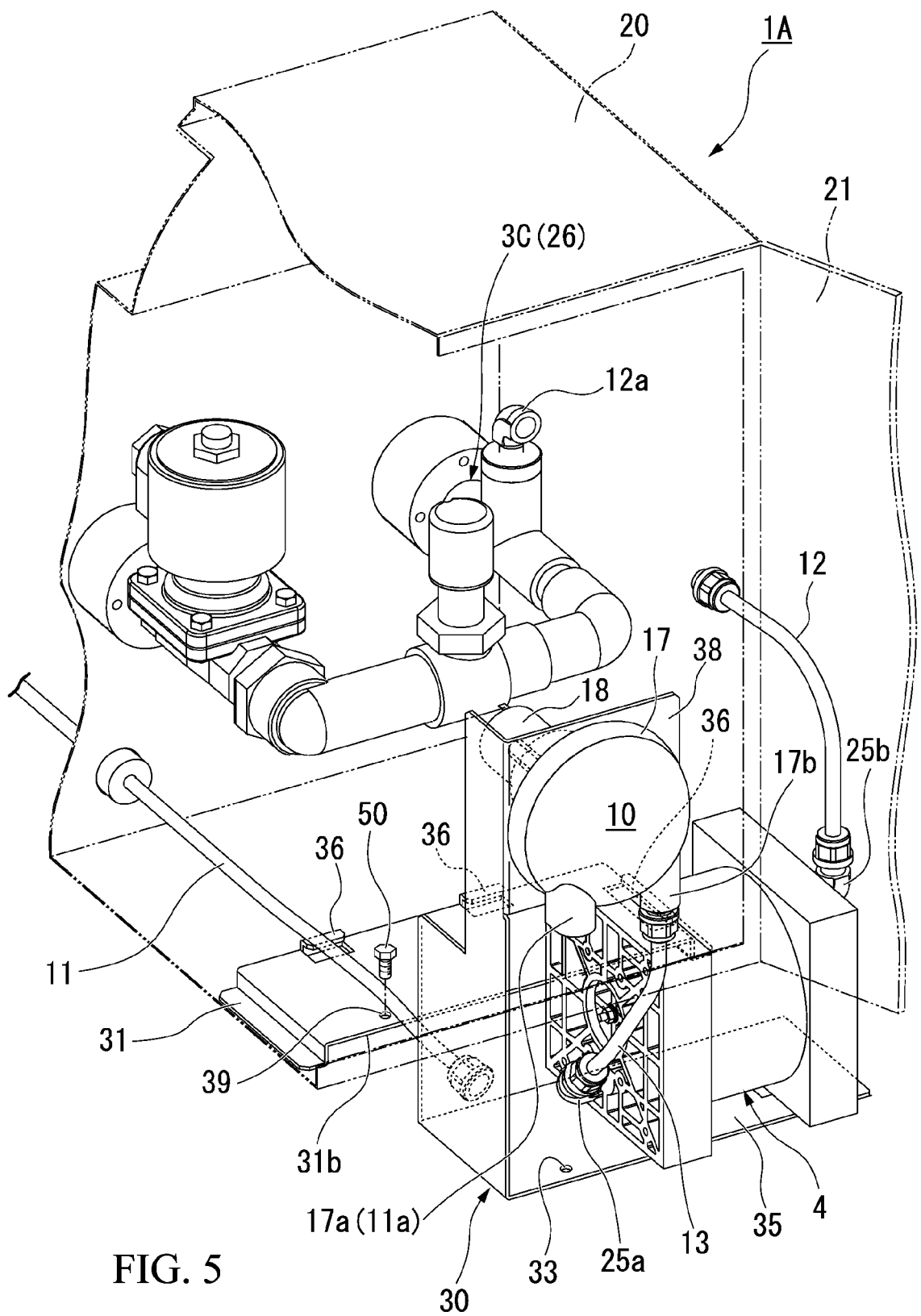
FIG. 5 is a perspective view showing a state in which the bracket of the electrolysis water-making apparatus according to the first embodiment of the present invention is removed from a casing.

First, a power supply of the electrolysis water-making apparatus 1A is turned OFF, and a flow of the hydrochloric acid solution and raw water is stopped. Then, as shown in FIG. 5, the opening/shutting door 21 of the casing 20 is opened, and the bolt 50 fixed to the installation base 31 is removed. Accordingly, the bracket 30 can be drawn to a side of the installation base 31 near the casing (in a direction of an arrow P).

Then, the first piping 11 is removed from the connecting location 11a of the pump 10 and the first piping 11, and the hydrochloric acid solution remaining in the first piping 11 is returned to the storage tank 9 shown in FIG. 2.

Next, the second piping 12 is removed from the connecting location 12a of the diluting unit 26 and the second piping 12. The removed second piping 12 is maintained in a state in which the mounting hole is directed upward such that the electrolyzed products remaining in the second piping 12 do not spill out.

In this state, the bracket 30 is drawn to one end side 31b of the installation base 31 (a direction of an arrow P), i.e., to a side near the casing. As the bracket 30 is drawn, the electrolytic cell 4 and the pump 10 are removed from the casing 20 by each bracket 30. Then, the bracket 30 is brought to a place where the process can be done easily and the hydrochloric acid solution or the like can be wasted, and thus, the electrolyzed products in the second piping 12 are discarded. After that, the third piping 13 connecting the pump 10 and the electrolytic cell 4 is removed from an inlet 17b of the pump 10, and the hydrochloric acid solution remaining in the third piping 13 is discarded.

When the pump 10 is replaced with a new one, the fastener installed at the pump attachment section 38 is unfastened to remove the pump 10 from the bracket 30. In addition, when the electrolytic cell 4 is replaced with a new one, the bolts 51 and 51 shown in FIG. 3 are removed to be separated from the bracket 30, appropriately performing the replacement.

When a new pump 10 or electrolytic cell 4 is attached, the above-mentioned removal sequence is performed in a reverse sequence. Specifically, as shown in FIG. 5, outside the casing 20, the actuator 18 of the pump 10 is inserted into the mounting hole 42 (see FIG. 4) of the pump attachment section 38 and fixed thereto by the fastener. As shown in FIG. 3, even in the electrolytic cell 4, the electrolytic cell 4 is installed at the bottom plate section 35 of the bracket 30 outside the casing 20, the side plate 15B abuts the rigid wall 40 of the electrolytic cell, and the bolts 51 and 51 are screwed and securely fixed to the male screw holes formed at the through holes 41 and 41 and the side plate 15B.

Next, the third piping 13 shown in FIG. 5 is connected to the output port 17b of the pump 10 and the inlet 25a of the electrolytic cell 4, and the bracket 30 is installed in the casing 20. In order to install the bracket 30 at the installation base 31 in the casing 20, an end of the bottom plate section 35 is slid and disposed between an upper surface of the installation base 31 and the catching plates 36, 36 thereof, and the bolt 50 is screwed and securely fixed to the male screw hole 39 of the installation base 31 through the through hole 33.

Then, as the first piping 11 is connected to the inlet 17a of the pump 10 and simultaneously the second piping 12 is connected between the outlet 25b of the electrolytic cell 4 and the diluting unit 26 to close the opening/shutting door 21 of the casing 20, replacement of the pump 10 or the electrolytic cell 4 is completed.

As described above, according to the electrolysis water-making apparatus 1A in accordance with the embodiment, the bracket 30 can be removed, and the pump 10 and the electrolytic cell 4 can be removed to the outside of the casing 20 by each bracket 30 to perform a discarding process or the like. Accordingly, the process of replacing the inside of the pump 10, the electrolytic cell 4, and the first to third pipings 11, 12 and 13 by water can be omitted, efficiency of the replacement process of the pump 10 and the electrolytic cell 4 can be increased, and water used in the replacement process can be saved.

In addition, even when the first and second pipings 11 and 12 connected to the pump 10 and the electrolytic cell 4 are removed in the casing 20, the process can be performed with almost no spilling out of the solution. For this reason, time spent cleaning the casing 20 can be omitted.

Furthermore, as the bolt 50 of the bracket 30 is removed, the first piping 11 is removed from the inlet 17a of the pump 10, and further, the second piping 12 is removed from the connecting location 12a of the diluting unit 26, removal of the bracket 30 from the casing 20 becomes possible, and the process in the casing 20 can be suppressed to a minimal level. For this reason, the replacement process can be easily performed. In addition, the pump 10 and the electrolytic cell 4 can be moved while attached to the bracket 30 to a place in which the process can be easily performed.

Further, since a configuration of the bracket 30 and a structure of the installation base 31 to which the bracket 30 is attached are simple, the manufacturing cost of the electrolysis water-making apparatus 1A can be suppressed to a low level.

Furthermore, since the casing 20 and the bracket 30 are detachably fixed to one place by the bolt 50, the bracket 30 may be removed by removing one bolt 50 when the bracket 30 is removed from the casing 20. In addition, one bolt 50 may be screwed when the bracket 30 is mounted on the casing 20. As described above, process can be simplified and workability can be improved, and part cost can also be saved. Further, the same effect can be obtained even when a fixing unit such as a split pin or a wing nut is employed instead of the bolt 50.

Figure 6:
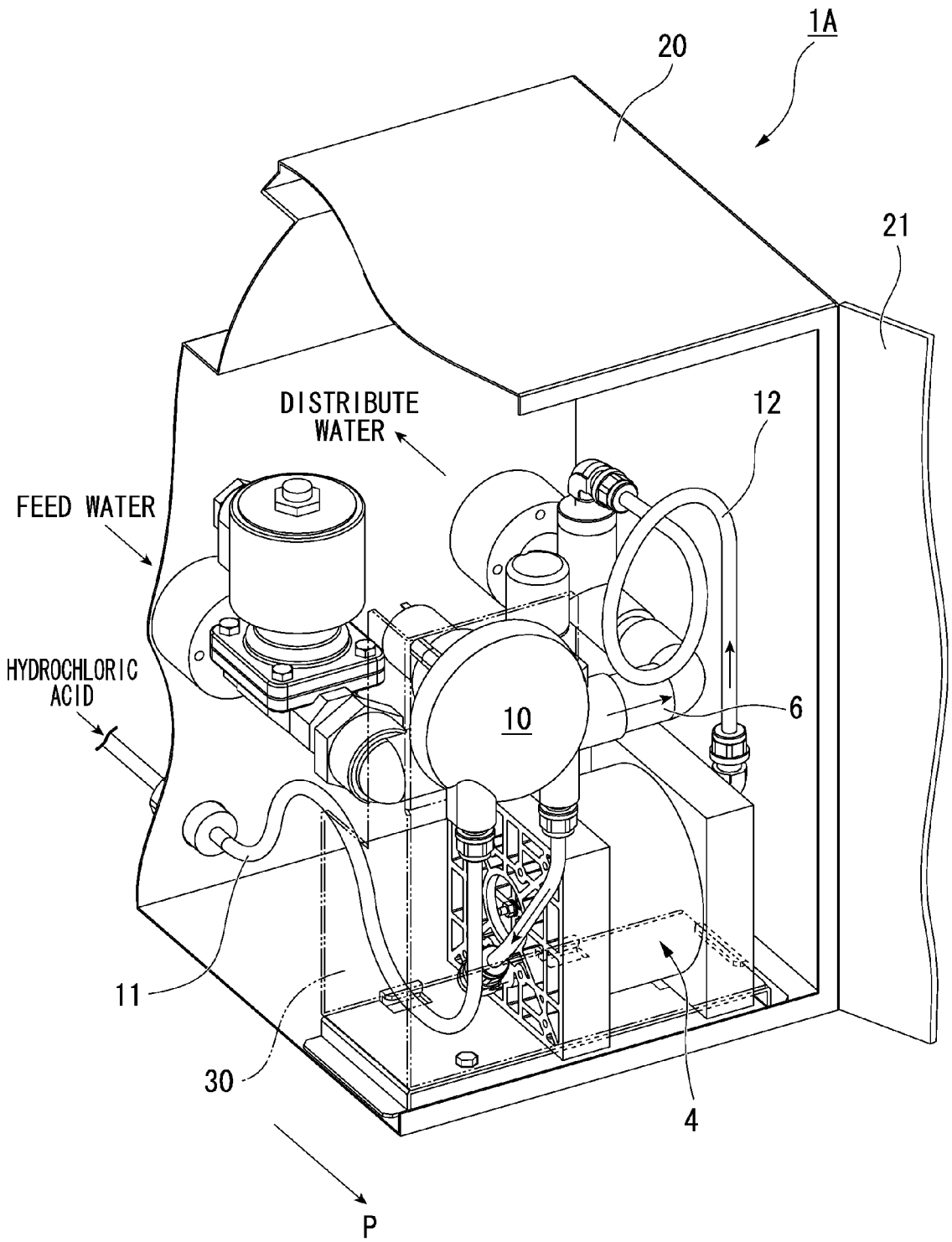
FIG. 6 is a perspective view showing a variant of the electrolysis water-making apparatus according to the first embodiment of the present invention.

In the embodiment, upon replacement of the pump 10 and the electrolytic cell 4, while the first and second pipings 11 and 12 are removed from the connecting locations 11a and 12a to remove the bracket 30 to the outside of the casing 20, as shown in FIG. 6, the length of the first and second pipings 11 and 12 may be set to be large, and the bracket 30 may be configured to be removed to the outside of the casing 20 in a state in which the first and second pipings 11 and 12 are connected to the pump 10 and the electrolytic cell 4.

As the above-mentioned configuration is provided, the first and second pipings 11 and 12 can be removed from the outside of the casing 20, and contamination in the casing 20 can be avoided even when the solution in the piping overflows upon removal of the pipings. In addition, when a sheet or a plate is prepared at the outside of the casing 20, the removal process of the first and second pipings 11 and 12 can be more easily performed.

In addition, a length of the first and second pipings 11 and 12 in the case of the above-mentioned configuration may be, for example, larger than a minimum length needed to maintain a connection state of the first and second pipings 11 and 12 when the bracket 30 is drawn in front of the casing 20 and the bracket 30 and the casing 20 are disposed in parallel such that a front edge of the casing 20 is in contact with a rear edge of the bracket 30 (a side near a solid line is "a front end" and an opposite side is "a rear end" when seen in a direction of the arrow P).

Next, a second embodiment of the present invention will be described. In the embodiment, like elements of the first embodiment are designated by like reference numerals, and description thereof will not be repeated.

Figure 7:
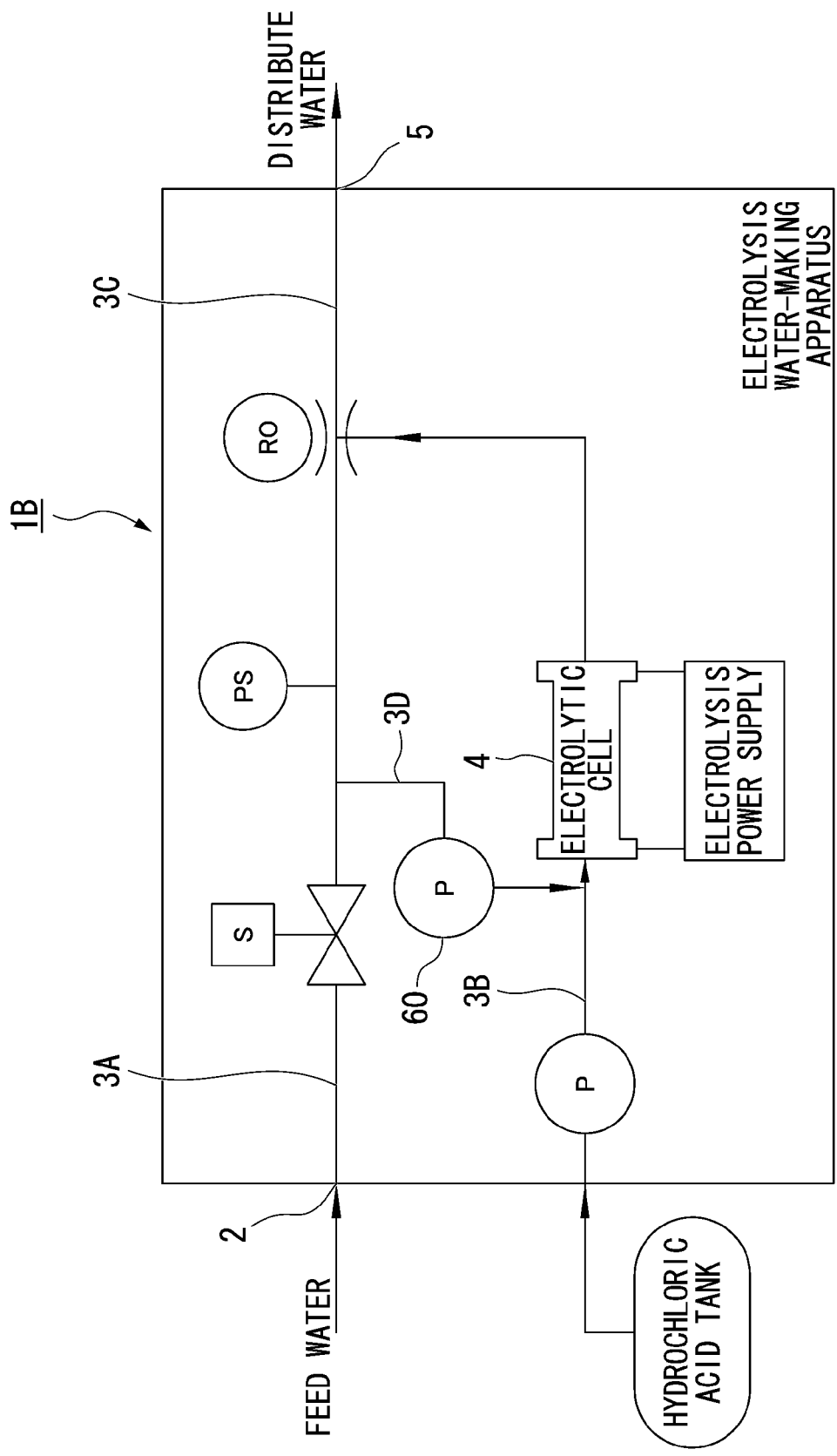
FIG. 7 is a view schematically showing a configuration of an electrolysis water-making apparatus according to a second embodiment of the present invention'

As shown in FIG. 7, an electrolysis water-making apparatus 1B according to the second embodiment includes a hydrochloric acid line 3D in addition to the configuration of the electrolysis water-making apparatus 1A according to the first embodiment. The hydrochloric acid line 3D has a starting end branched from the raw water line 3A and a terminating end joined with an upstream side of the electrolytic cell 4 in an electrolyzed products generating line 3B. Then, the hydrochloric acid line 3D includes a dilution water feed pump 60.

The dilution water feed pump 60 extracts raw water from the raw water line 3A, and mixes the raw water with a hydrochloric acid solution before performing electrolysis. The dilution water feed pump 60 can appropriately adjust a concentration of the hydrochloric acid solution supplied into the electrolytic cell 4.

Figure 8:
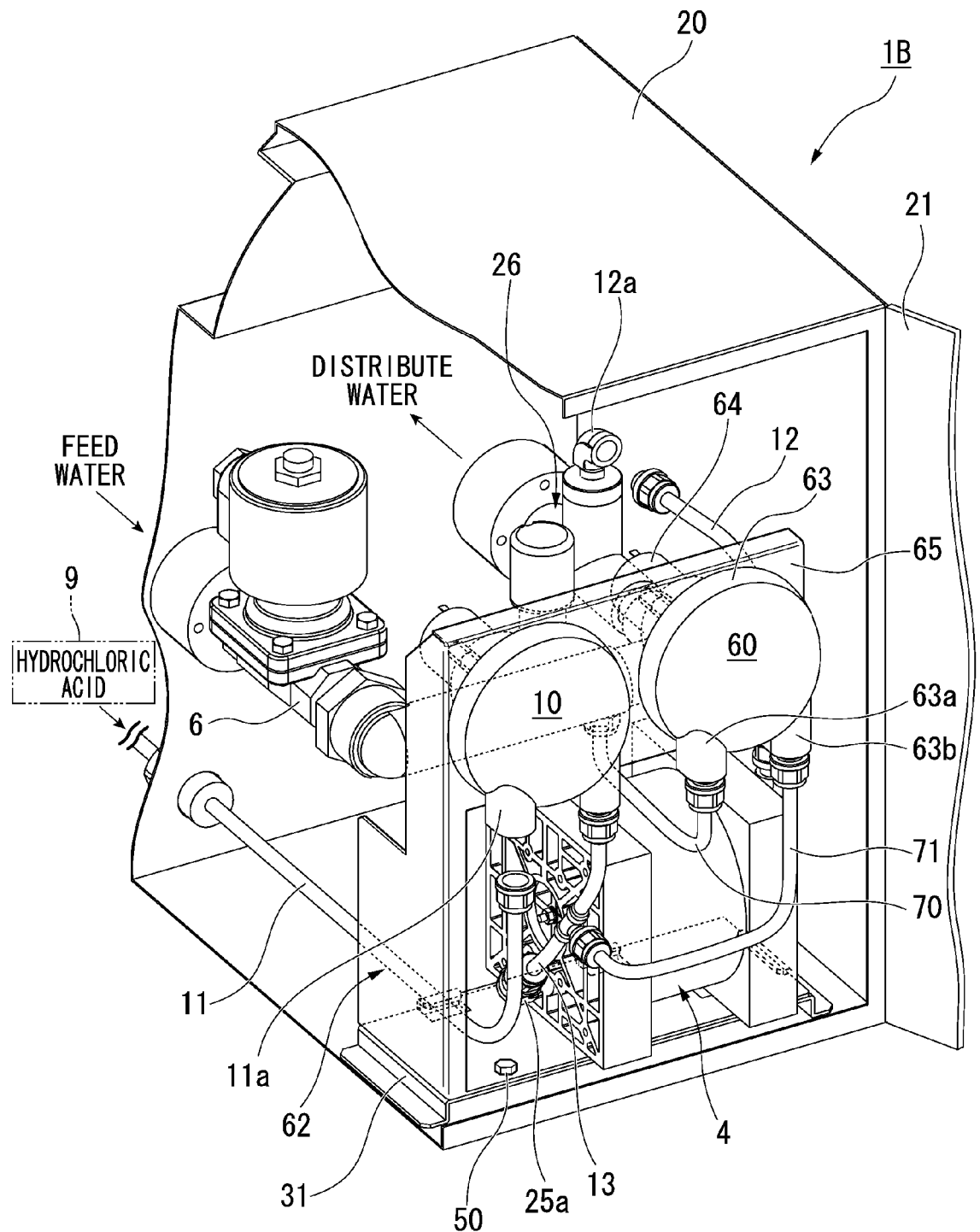
FIG. 8 is a perspective view showing the inside of the electrolysis water-making apparatus according to the second embodiment of the present invention.

As shown in FIG. 8, this embodiment is distinguished from the electrolysis water-making apparatus 1A according to the first embodiment in that a bracket 62 is configured to hold the dilution water feed pump 60 in addition to the electrolytic cell 4 and the raw material solution feed pump 10.

The dilution water feed pump 60 suctions dilution water from the water supply line 6, and the dilution water is delivered into the third piping 13 connected to the inlet 25a of the electrolytic cell 4. The dilution water feed pump 60 has the same configuration as the raw material solution feed pump 10, and includes a pump body 63 having a disc shape, and an actuator 64. The pump body 63 accommodates a tube and a rotor configured to rotate a roller that crushes the tube, and moves the dilution water in the tube by rotation of the rotor. The actuator 64 drives the rotor. An inlet 63a configured to suction the dilution water and an output port 63b configured to pump the dilution water toward the third piping 13 are formed under the pump body 63.

A fourth piping 70 is connected between the inlet 63a of the pump 60 and the water supply line 6. A fifth piping 71 is connected between the output port 63b and the third piping 13.

Figure 9:
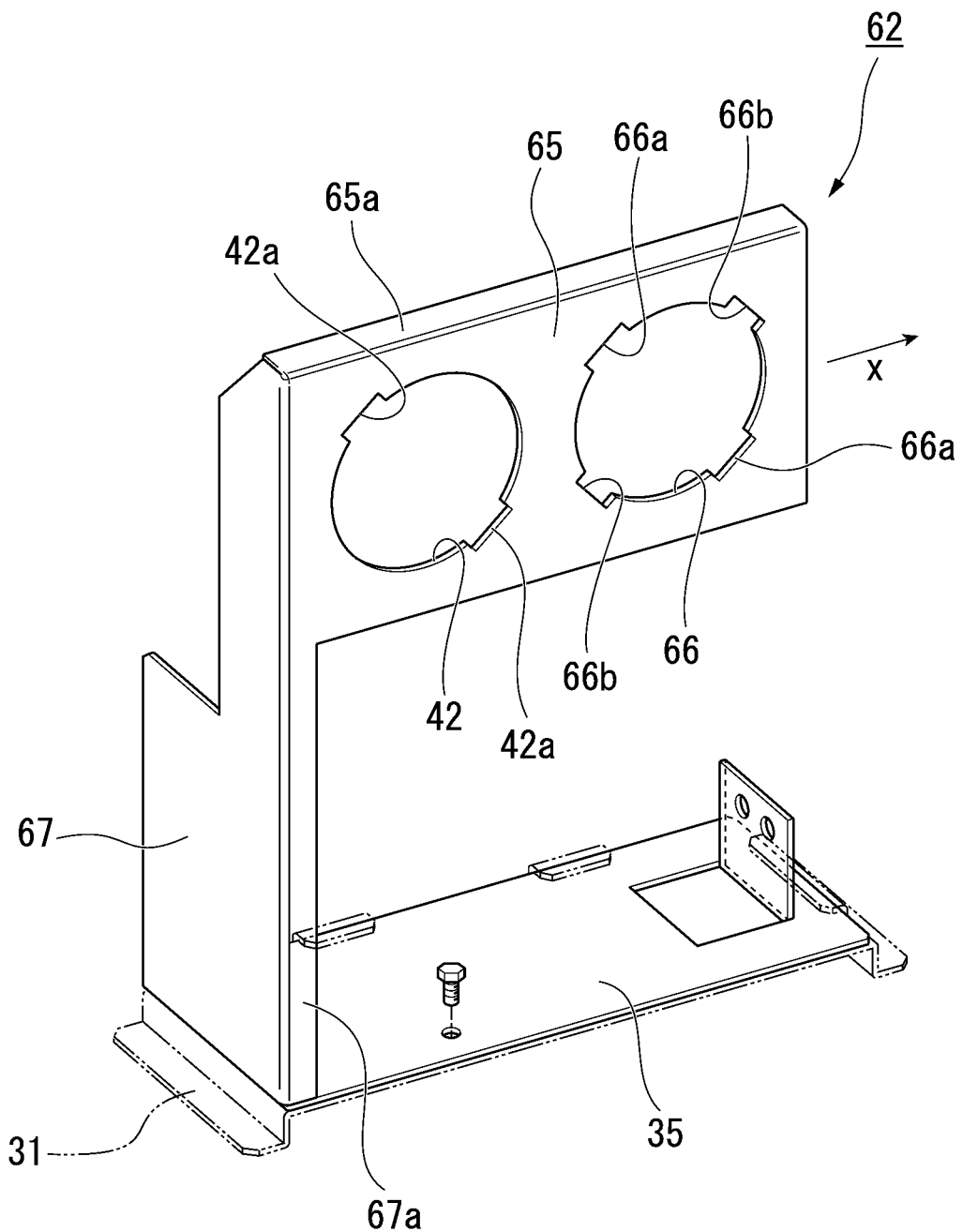
FIG. 9 is a perspective view showing a bracket of the electrolysis water-making apparatus according to the second embodiment of the present invention.

As shown in FIG. 9, a mounting hole 42 configured to hold the pump 10 at a pump attachment section 65 and a mounting hole 66 configured to hold the pump 60 are formed in the bracket 62. In addition, the bracket 62 includes a fastener such as a bolt or a clip (not shown) configured to hold the pumps 10 and 60.

A pair of hooks 66a and 66a and a pair of hooks 66b and 66b are formed at the mounting hole 66. On the other hand, a pair of catching plates (not shown) snap-fitted to the hooks 66a or the hooks 66b protrude from a rear side of the pump body 63 of the pump 60 shown in FIG. 8 (a side in contact with the pump attachment section 65). The hooks 66a or the hooks 66b are fitted to the catching plates of the pump 60 to become an angle determining unit of the pump 60.

When the pump 60 is attached to the bracket 62, first, the actuator 64 is inserted into the mounting hole 66. Here, the pair of catching plates (not shown) formed at the rear side of the pump body 63 are inserted to be fitted to the pair of hooks 66a and 66a formed at the mounting hole 66. Accordingly, an angle of the pump 60 with respect to the bracket 62 always becomes a certain angle, and the pump 60 is prevented from being pivoted with respect to the bracket 62.

Then, the dilution water feed pump 60 is appropriately fixed by the fastener such as a bolt or a clip (not shown) installed at the pump body 63 and the pump attachment section 65 with the pump attachment section 65 sandwiched therebetween.

In addition, in the above-mentioned example, while the pair of catching plates (not shown) are fitted to the pair of hooks 66a and 66a, these may be fitted to the pair of hooks 66b and 66b.

The pair of hooks 66b and 66b are formed at a position at which a straight line connecting the hooks 66b and 66b is substantially perpendicular to a straight line connecting the hooks 66a and 66a. For this reason, when the catching plates of the pump 60 are fitted to the hooks 66b and 66b, in comparison with the case in which they are fitted to the hooks 66a and 66a, the pump 60 is rotated 90° counterclockwise (counterclockwise when seen from a side near the casing of the installation base 31 or a side of the pump body 63) and attached thereto.

In this state, the inlet 63a and the output port 63b shown in FIG. 8 are directed in a direction of an arrow X shown in FIG. 9. For this reason, workability can be further improved with no interference with the electrolytic cell 4 when the process of connecting or separating the fourth piping 70 and the fifth piping 71 to and from each other is performed.

In addition, the side plate section 67 of the bracket 62 is a wall section standing up from a side edge of the bottom plate section 35. The side plate section 67 includes a bent section 67a configured to prevent the side plate section 67 from being bent due to weights of the pumps 10 and 60 when the pumps 10 and 60 are attached to the pump attachment section 65.

In addition, a bent section 65a is also formed at an upper end of the pump attachment section 65. The bent section 65a prevents the pump attachment section 65 from being bent due to the weights of the pumps 10 and 60 when the pumps 10 and 60 are attached thereto.

As shown in FIG. 8, when the electrolytic cell 4, the raw material solution feed pump 10, and the dilution water feed pump 60 of the electrolysis water-making apparatus 1B are replaced with new ones, the bolt 50 of the bracket 62 is removed and the bracket 62 is in an extractable state.

The first piping 11 is removed from the connecting location 11a to return the hydrochloric acid solution to the storage tank 9. After that, the second piping 12 and the fourth piping 70 are removed from the connecting location 12a of the diluting unit 26 side and the connecting location of the water supply line 6 side, respectively. The second and fourth pipings 12 and 70 are held so that the mounting holes thereof being upward.

In this state, the bracket 62 by which the electrolytic cell 4 and the pumps 10 and 60 are attached is removed to the outside of the casing 20 to discard the chloride solution and electrolyzed products in the piping. Further, the third and fifth pipings 13 and 71 are removed, and a member requiring replacement is replaced with a new member to be fixed to the bracket 62.

Then, the third and fifth pipings 13 and 71 are connected again, and the bracket 62 is installed at and fixed to the installation base 31 in the casing 20. Next, the first, second and fourth pipings 11, 12 and 70 are connected to predetermined connecting locations, to close the opening/shutting door 21 of the casing 20, completing the replacement of the member.

As described above, according to the electrolysis water-making apparatus 1B in accordance with the second embodiment, even when the fifth piping 71 and the dilution water feed pump 60 are connected to the third piping 13 configured to deliver the hydrochloric acid solution to the electrolytic cell 4 and connection relation of the piping is complicated, only a minimum piping connected to the storage tank 9 and the water supply line 6 is removed, and the electrolytic cell 4 and the pumps 10 and 60 are integrally moved to the outside of the casing 20 by the bracket 62, enabling the replacement process.

Then, the electrolytic cell 4 and the pumps 10 and 60 can be integrally moved to the outside of the casing 20 by the bracket 62. For this reason, since removal and waste solution treatment of the piping connecting the respective members become easy and are completed with almost no contamination of the inside of the casing 20 due to the chloride solution and electrolyzed products, working efficiency can be increased.

In addition, similar to the effect obtained by the electrolysis water-making apparatus 1A according to the first embodiment, since the configuration of the bracket 62 becomes simple, manufacturing cost of the electrolysis water-making apparatus 1B can be suppressed.

Further, as a plurality of angle determining means such as the pair of hooks 66a and 66a and the pair of hooks 66b and 66b are provided, the dilution water feed pump 60 can be attached while varying an angle with respect to the bracket 62, and thus a degree of freedom of layout of the piping to be connected to the dilution water feed pump 60 is increased to improve workability of connection and removal.

INDUSTRIAL APPLICABILITY

According to the electrolysis water-making apparatus in accordance with the present invention, after the electrolytic cell and the raw material solution feed pump are integrally removed by the bracket to be moved to the outside of the casing, treatment of the solution in the electrolytic cell or the raw material solution feed pump is performed. Accordingly, in the replacement of the electrolytic cell or the raw material solution feed pump, the process of replacing the inside of the electrolytic cell by water can be omitted, and working efficiency of the replacement can be increased.

DESCRIPTION OF REFERENCE NUMERALS 1A, 1B electrolysis water-making apparatus
4 electrolytic cell
9 storage tank
10 raw material solution feed pump
11 first piping
11a connecting location
12 second piping
12a connecting location
20 casing
26 diluting unit
30 bracket
50 bolt
60 dilution water feed pump
62 bracket
66a hook
66b hook

What is claimed is:
1. An electrolysis water-making apparatus comprising:
a casing having an inner wall surface that defines a space inside the casing;
an electrolytic cell installed in the casing and configured to perform electrolysis on a raw material solution;
a raw material solution feed pump configured to pump the raw material solution to the electrolytic cell; and a diluting unit configured to dilute electrolyzed products extracted from the electrolytic cell with dilution water;

a bracket provided with an attachment portion capable of being attached to the inner wall surface of the casing, the bracket configured to integrally attach the electrolytic cell and the raw material solution feed pump, and configured to be detachably fixed to the inner wall of the casing by the attachment portion in a state in which the electrolytic cell and the raw material solution feed pump are attached thereto, wherein a first piping is connected between the raw material solution feed pump and a storage tank configured to store the raw material solution, a connecting location of the first piping and the raw material solution feed pump is disposed over the storage tank, a second piping is connected between the electrolytic cell and the diluting unit, a connecting location of the second piping and the diluting unit is disposed over a connecting location of the second piping and the electrolytic cell, the first and second pipings are formed of a flexible pipe, the bracket has a first position in which the bracket is housed inside the casing and has a second position in which the entire bracket is extracted from the casing, the first piping has a length such that a connection with the storage tank is capable of being maintained when the bracket is positioned in the second position while the first piping is connected to a connecting location of the raw material solution feed pump, and the second piping has a length such that a connection between the electrolytic cell and the diluting unit is capable of being maintained when the bracket is positioned in the second position while the second piping is connected to a connecting location of the electrolytic cell and a connecting location of the diluting unit.

2. The electrolysis water-making apparatus according to claim 1, further comprising a dilution water feed pump configured to pump dilution water to the electrolytic cell, wherein the dilution water feed pump is detachably attached to the bracket.

3. The electrolysis water-making apparatus according to claim 2, wherein the dilution water feed pump is detachably attached to the bracket with a variable angle.

4. The electrolysis water-making apparatus according to claim 1, wherein the casing and the bracket are detachably fixed to one place.

* * * * *